(12) United States Patent
De Souza

(10) Patent No.: US 6,871,188 B2
(45) Date of Patent: Mar. 22, 2005

(54) METHOD AND ARRANGEMENT FOR PROVIDING ACCESS TO A CONSUMER DEVICE

(75) Inventor: Allan Michael De Souza, Amsterdam (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 417 days.

(21) Appl. No.: 09/912,478

(22) Filed: Jul. 25, 2001

(65) Prior Publication Data

US 2002/0023021 A1 Feb. 21, 2002

(30) Foreign Application Priority Data

Jul. 27, 2000 (EP) ............................................. 00202666

(51) Int. Cl.⁷ .......................... G06F 17/60; H04N 7/16; H04N 5/445
(52) U.S. Cl. .............................. 705/27; 705/26; 725/27; 725/60
(58) Field of Search ....................... 705/26, 27; 725/27, 725/60, 61

(56) References Cited

U.S. PATENT DOCUMENTS

| | | | | |
|---|---|---|---|---|
| 5,619,249 A | * | 4/1997 | Billock et al. | 725/5 |
| 5,694,549 A | * | 12/1997 | Carlin et al. | 709/250 |
| 5,812,769 A | * | 9/1998 | Graber et al. | 709/228 |
| 5,818,438 A | | 10/1998 | Howe et al. | 345/327 |
| 6,029,141 A | * | 2/2000 | Bezos et al. | 705/27 |
| 6,363,356 B1 | * | 3/2002 | Horstmann | 705/26 |
| 6,603,758 B1 | * | 8/2003 | Schmuelling et al. | 370/352 |
| 6,628,307 B1 | * | 9/2003 | Fair | 345/763 |
| 2002/0036658 A1 | * | 3/2002 | Carolan et al. | 345/764 |
| 2003/0115602 A1 | * | 6/2003 | Knee et al. | 725/42 |
| 2004/0078274 A1 | * | 4/2004 | Aarnio | 705/26 |

FOREIGN PATENT DOCUMENTS

| | | | | |
|---|---|---|---|---|
| EP | 1014645 A2 | * | 6/2000 | |
| FR | 2794601 A1 | | 2/1999 | ............. H04N/7/16 |
| WO | WO9641478 | | 12/1996 | .......... H04N/7/173 |
| WO | WO0005889 | | 2/2000 | ............. H04N/7/16 |

OTHER PUBLICATIONS

Anon., "Nescape, 5RBOCs to Market New Internet Access Services," Newbytes News Network, Dec. 10, 1996.*
Anon., "Commission Clears Vodafone, Vivendi and Canal+ Internet Venture," European Report, Jul. 26, 2000.*
EBU Review Technical, "Functional Model Of A Conditional Access System," European broadcasting Union, Brussels, BE, Dec. 21, 1998, pp. 64–67.
By Paul Kagan, Entitled: "CCTV Passes NDS Digital TV Portal Corp." Kagan.Com Dec. 20, 2000, p. 1. http://www.kagan.com.
By David Carlson, AJR Newslink, Entitled Media Giants Create Web Gateways,, American Journalism Review, Mar. 6, –12, 2001. pp. 1–3. http://ajr.newslink.org.

(List continued on next page.)

Primary Examiner—Nicholas D. Rosen
(74) Attorney, Agent, or Firm—Dicran Halajian

(57) ABSTRACT

A method of and arrangement for providing access to a consumer device (101). A user can switch between multiple content providers. To switch, he calls up a set of representations (202–207) of offerings by content providers (107, 108, 109). He can then select a content provider. The selection is submitted to a gateway system (106), which then provides the selected content provider access to the consumer device (101), preferably in return for a fee paid by the selected content provider. The invention makes it easier for users to switch content providers even when descrambling boxes, subscriptions and other hassles are normally involved in switching. All these hassles are taken care of by the gateway (106).

9 Claims, 3 Drawing Sheets

OTHER PUBLICATIONS

Figure 1:
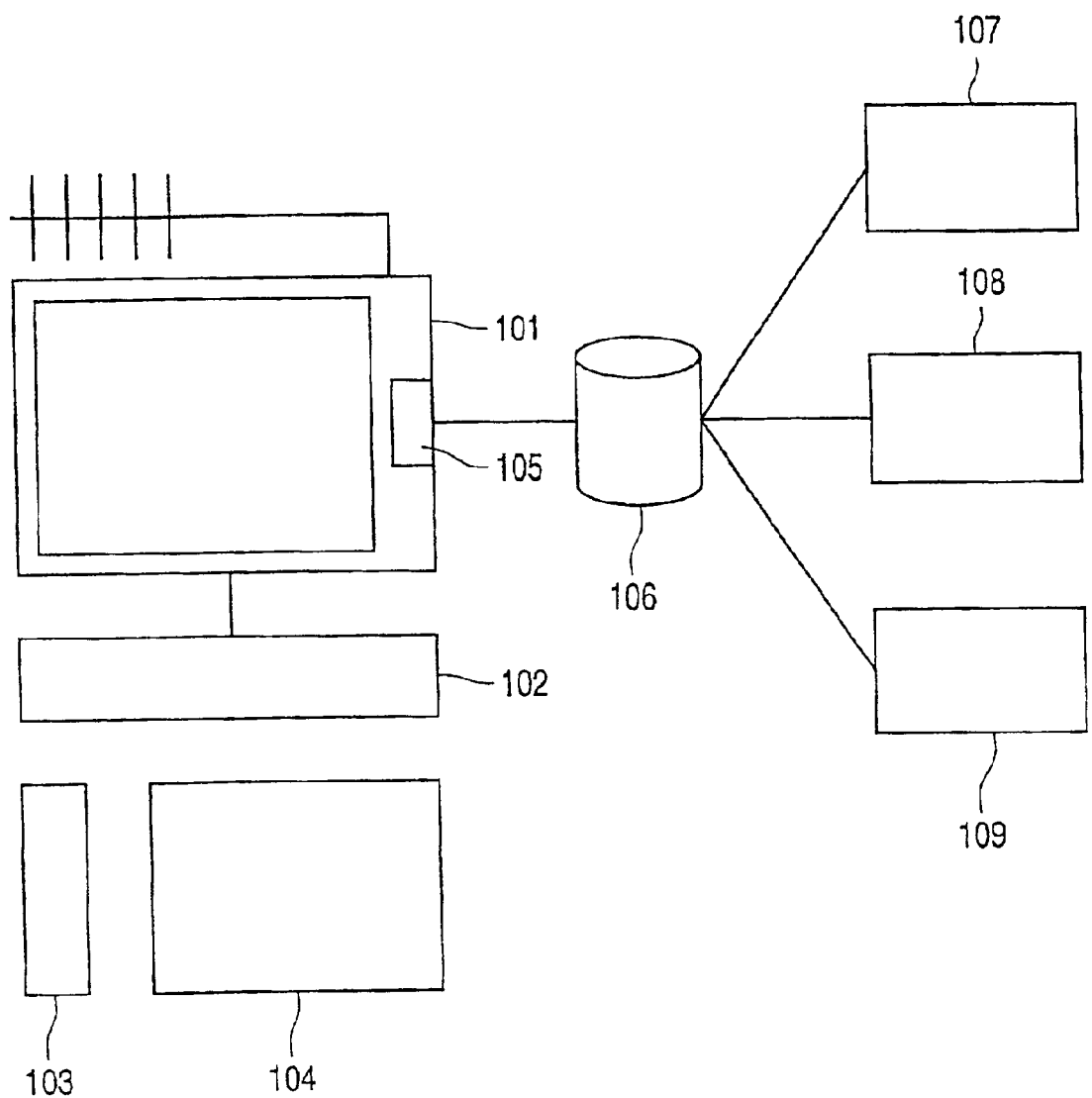

By Karen J. Bannan, Entitled: "Gemstar Opens TV Portal War" ZDNET: Printer Friendly, Oct. 8, 1999. p. 1–1. http://www.zdnet.com.

By Turner Satellite, T S Direct—Dish Network, p. 1–4. http://tsdirect.com.

By Rich Lehrbaum, Entitled: New Sylvania Digital Internet/TV Has "LINUX Inside" ZDNET, Mar. 8, 2001. http://www.zdnet.com. p. 1–4.

By http://www.wave–report.com Entitled "The Wave Report" pp. 1–16.

* cited by examiner

METHOD AND ARRANGEMENT FOR PROVIDING ACCESS TO A CONSUMER DEVICE

The invention relates to a method of and an arrangement for providing access to a consumer device.

The invention further relates to a gateway system and a consumer device for use in such an arrangement.

As the consumer electronics world migrates from analog to digital technology and from narrowband to broadband networks, the value of consumer electronics business models that incorporate software and services is growing relative to the value of business models based on hardware alone.

This shift towards services has already taken place in the computer world, where software application and computer service providers are valued more highly per revenue dollar or net asset dollar than traditional PC manufacturers. It is now emerging in the TV world with development of technologies that enable digital TV.

It has often been—and it still is—a common mistake to equate digital TV services solely with digital televisions (HDTVs or SDTVs). Digital services can also be delivered over higher volume analog TVs that are equipped to accept a digital feed (gatewayed is the term we will use). As a result, content providers have started developing digital applications and services that run over analog TVs.

Competition for service value capture has primarily taken four forms in today's Consumer Electronics market, depending on the consumer hardware interface (PC and TV) and the type of access network (one-way data broadcasting, two-way narrowband networks, particularly telco lines, and two-way proprietary broadband networks such as US digital cable networks). This landscape will expand over time as new consumer hardware appears, such as audio and TV peripheral appliances, and converges towards 'Home Networks', where all appliances are connected to a Home Network with a single gateway to the Internet, and broadband networks become common carriers.

TV service providers typically allow consumers access to their services through some kind of subscription service. Once the consumer has subscribed, he can access the service with his television. Often he also has to install a set-top box or decoder to gain access, because the service is often provided in an encrypted or scrambled format to prevent unauthorized access.

The service may include a variety of content such as television programs, movies and interactive services. The service provider will often bundle programs, movies and interactive services from various content providers into one offering. The consumer can then choose one or more offerings, e.g. the movie offerings and the sports offerings, but not the adult movie offerings or the interactive services. Of course, choosing more offerings is more expensive.

The various TV service providers compete with each other to get consumers to subscribe to their services. Once a consumer has subscribed to one service provider, switching to another service provider means having to cancel the subscription, return the decoder, get a bond back, fill in a new subscription and install a new decoder. Such hassles make it expensive in terms of time and effort for a user to switch. When the costs of switching from one brand of technology to another are substantial, users face lock-in. Having locked-in customers is a very favorable position for a service provider, since he is assured of repeat business. A competing service provider can overcome this problem by lowering the cost of entry for the user, that is, by renting out its decoder or offering a premium for every old decoder that is exchanged for a new one. However, most of the hassles involved still remain.

Some service providers operate via satellite, bypassing the traditional cable line access networks. The capacity of a satellite link is such that a very large number of channels can be offered, so that these satellite service providers can provide access to content and services from multiple content providers. However, satellite services require a dish and a receiver, which means that here the lock-in problem also exists.

It is an object of the invention to provide a method of providing access to a consumer device, which is flexible and easy to use.

This object is achieved according to the invention in a method comprising allowing a user to select a content provider from a set of representations of offerings by content providers, receiving a selection of a content provider from the set, and providing the selected content provider access to the consumer device. This method, typically performed by a gateway system to which the consumer device is connected, allows a user to switch between an almost unlimited number content providers without any hassle involved. The user can examine the offerings or packages from each content provider, and at his leisure pick the one that suits him most. The gateway system facilitates the subscription and the subsequent access to the selected content provider's offerings. At any time, the user can make another selection from the set of representations and thereby switch to another content provider.

In an embodiment the method further comprises providing registration information on the user to the selected content provider for facilitating a subscription for the user to the selected content provider. By handling registrations in this fashion, the process becomes almost transparent to the user, since he now only has to pick a content provider in order to switch. All the details with respect to registration and subscribing are handled by the gateway system.

In a further embodiment providing access comprises receiving a transmission from the selected content provider and intended for the consumer device, and retransmitting the transmission to the consumer device. An advantage of this embodiment is that the content providers now have to distribute their content and offerings only to the gateway system, and not to all individual consumer devices. This saves them from having to deploy a large and expensive transmission infrastructure, such as a cable network or a number of satellites. A single connection to the gateway system allows the content providers to (potentially) reach the entire population of the gateway system's user base.

In a variant of this embodiment providing access further comprises transcoding the transmission to a format suitable for the consumer device. By transcoding the transmission, the consumer device does not need to be adapted when the user switches to a new content provider. An additional advantage of this embodiment is that the user is now effectively locked into the gateway system operator, since it is to be expected that no other entity can transcode to that format. So, the user would need a new consumer device in order to be able to switch to another gateway system or directly to a single content provider.

In a further embodiment the method further comprises receiving a referral fee from the selected content provider after arranging the access to the consumer device. Factors such as 'winner take all' at the subscriber level and important benefits from scale lead digital content providers to compete through 'land grab' strategies. They will be willing to spend a significant amount of the expected Net Present Value (NPV) of a new customer on converting that customer to their customer base. The stock market has, to date, highly rewarded those content providers who have intelligently and aggressively grown their subscriber base through a 'land grab' approach.

In the near future, most major markets will have several Internet TV content providers competing to build customer bases in a 'land grab' manner. It is within this context that a gatewayed TV strategy makes economic sense. Each content provider should be willing to pay the operator of a gateway between a consumer and the content provider a certain amount of the lifetime NPV of a consumer that is added to its customer base. The more valuable each consumer becomes, the higher the 'referral fee' that each content provider should be willing to pay.

It is a further object of the invention to provide an arrangement for providing access to a consumer device, which is flexible and easy to use.

This object is achieved according to the invention in an arrangement whereby the consumer device comprises input means for allowing a user to select a content provider from a set of representations of offerings by content providers, and selection means for submitting a selection of a content provider from the set to a gateway system connected to the consumer device, the gateway system comprising selection reception means for receiving a selection of a content provider from the selection means, and access means for providing the selected content provider access to the consumer device.

Figure 2:
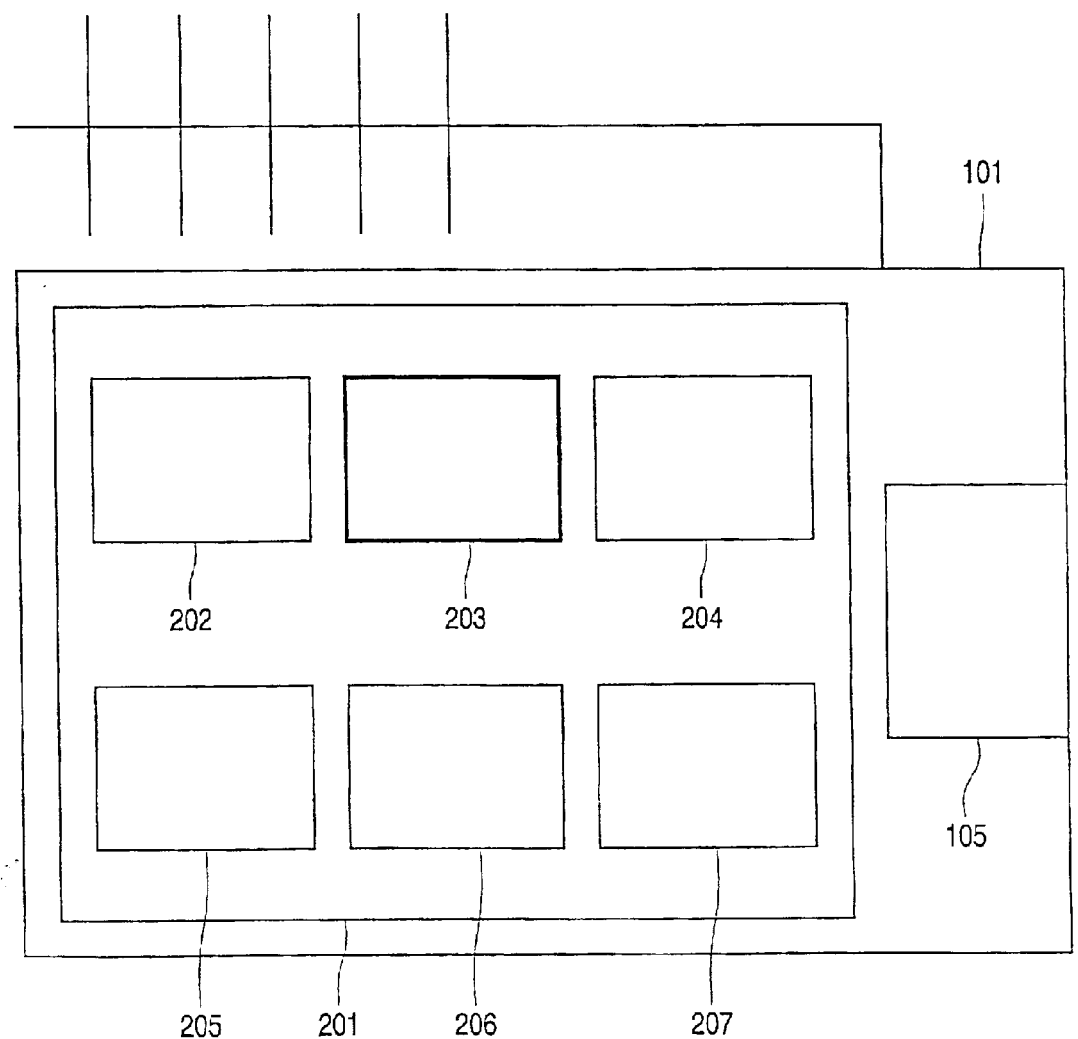

These and other aspects of the invention will be apparent from and elucidated with reference to the embodiments shown in the drawing, in which:

FIG. 1 schematically shows a first embodiment of an arrangement comprising a consumer device, a gateway device and a number of content providers;

FIG. 2 schematically shows an embodiment of an consumer device; and

Figure 3:
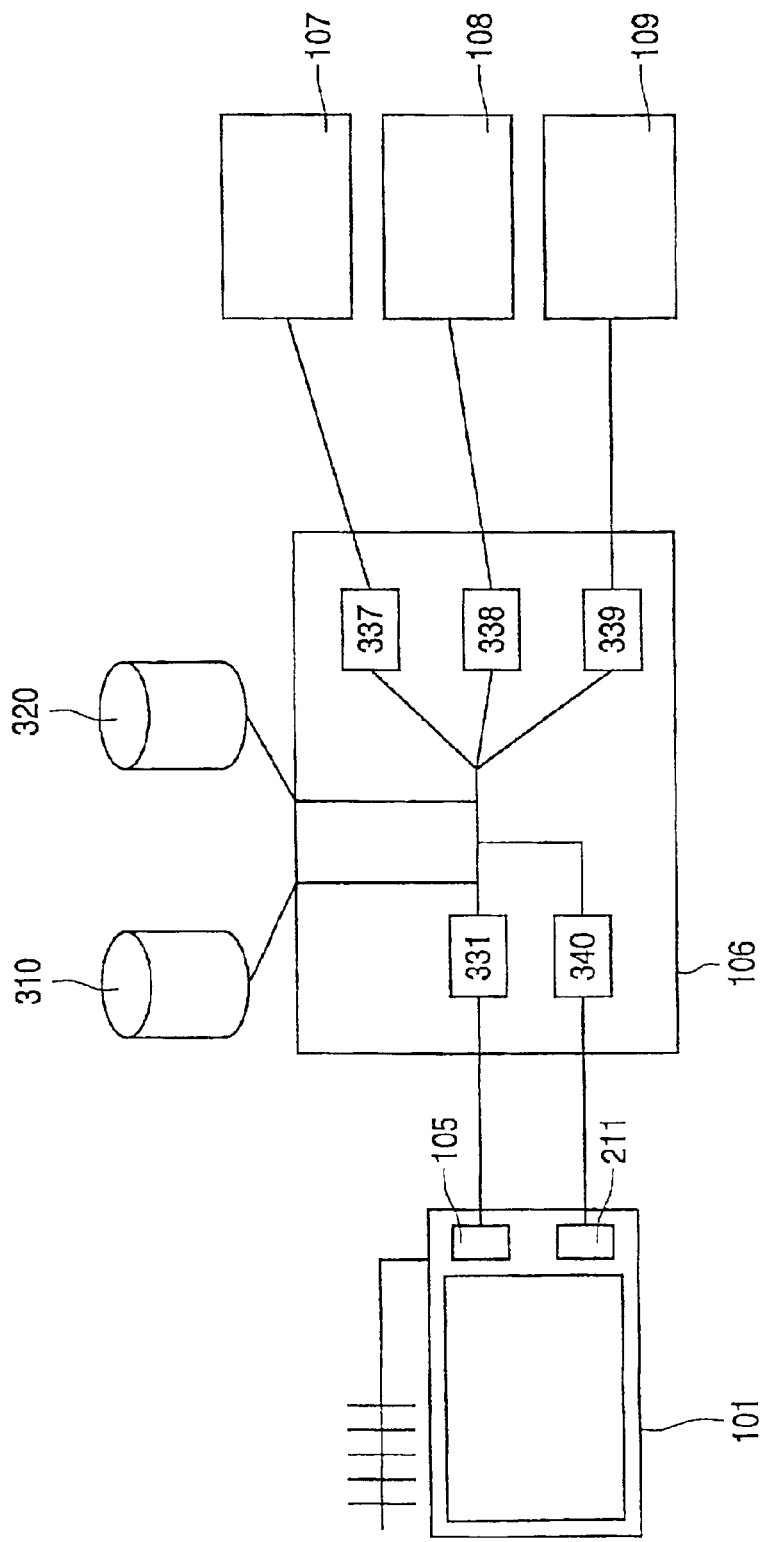

FIG. 3 schematically shows a second embodiment of an arrangement comprising a consumer device, a gateway device and a number of content providers.

Throughout the figures, same reference numerals indicate similar or corresponding features. Some of the features indicated in the drawings are typically implemented in software, and as such represent software entities, such as software modules or objects.

FIG. 1 schematically shows a first embodiment of an arrangement comprising a consumer device 101, a gateway device 106 and a number of content providers 107, 108, 109. In the embodiment shown, the consumer device 101 is a television, but of course other consumer electronics products, such as screen radios with Internet radio providers, screen phones with internet telephony providers, Net Monitors with service provider relationships similar to TV, DVDs with TV, games, and/or personalized TV applications can easily be used as well. The consumer device 101 may be arranged to receive broadband or narrowband content.

The consumer device 101 may further comprise a video recorder or set-top box 102. To control the device 101, a remote control 103 and/or a remote keyboard 104 may be available. These devices preferably communicate with the device 101 using infrared or radio communication, although a wired connection could also be used.

As an alternative or supplement to set-top box 102, an access module 105 can be provided in the device 101. The access module 105 can be inserted in the device 101 at the time of manufacture of the device 101, but may also be sold separately and be installed by a consumer. This allows easy upgrading of the device 101 or of the access module 105, should new technologies such as xDSL become available.

Through the access module 105, the device 101 is able to communicate with a gateway system 106. The access module 105 may to this end be connected to a telephone network, local area network, home network, the Internet or a two-way cable network or a similar network. The technology used to connect the access module 105 to the server may be ISDN, POTS, ADSL or any similar technology. The connection may also comprise using an Internet Access Provider, through which communication with the gateway system 106 can be facilitated over the Internet. The gateway system 106 can be a head-end system in a cable network, to which content providers 107, 108, 109 supply content, which is then coded for transmission over the cable network and distributed to the cable service subscribers.

The gateway system 106 provides access to the consumer device 101 for the content providers 107, 108, 109. The gateway system 106 may provide services such as registration, device management, upgrading, diagnosis, configuration and possibly accounting or billing content providers. Using the gateway system 106, the consumer can use his device 101 to access the content offered by a content provider, as will become apparent below.

The WebTV product provides an example of the Web-on-TV concept. WebTV carries out several value added activities as an Internet TV broadcaster. First, it provides an interface for broadcasters who want to enhance their broadcasted programs. Second, WebTV Networks provide a Proxy service between the user and the content. This allows them to preprocess the Web content before delivery to the WebTV device in the user's home. Such pre-processing processing allows them to maximize the chance that the WebTV box will do something sensible with the content despite the fact that it was probably authored for PC display with its screen resolution and color depth. Transcoding of content types allows the box to have a subset of data type decoders usually found on a PC whilst still being able to display the content.

However, the arrangement according to the invention offers more than simple TV-based Web access. The strategy is to provide the consumers with an enhanced TV experience that can use the Internet's capabilities to deliver. This experience will evolve into Internet based broadcasting. This enhanced TV experience will include a combination of packaged push content, customized pull content, and consumer generated content. Examples of currently available services include interactive EPGs, program specific information, rich (video) e-mail, search, and chat. A highly visual format can be used to appeal to low-tech TV viewers who are seeking 'lazy interactivity' entertainment, in contrast to the highly interactive and informational approach of PC portals.

FIG. 2 shows the consumer device 101 in more detail. The device 101 has a display 201, on which content such as television programs can be presented to the user. According to the invention, a switchboard approach is used to provide the user the ability to choose a content provider, such as WebTV or AOL, while current Internet TV set-top-boxes are restricted to a single content provider. To this end, the display 201 provides a single consumer interface for choosing a content provider. This interface or switchboard is a 'storefront' for digital service provider options to the consumer. For each available provider, a representation 202–207, which can be an icon or picture of some sort, is displayed, and for each provider a demonstration can be executed that enables the consumer to experience the benefits of its offer.

The user can move a pointer over the display 201 to select one of the representations 202–207. The user's remote control 103 could be provided with forward and backward buttons, a four-way cursor, a jog shuttle, a scroll wheel, a laser pointer or some other input mechanism to indicate the direction(s) in which the pointer is to be moved. Alternatively, the consumer device 101 may be arranged to receive input through a voice command, and the pointer can be configured to be moved over the display 201 in response to the appropriate voice commands. If the system according to the invention is embodied on a computer system, an input device such as a mouse or cursor keys on a keyboard may be used to position the pointer on the display 201.

Rather than freely moving the pointer over the display 201, it may be desirable to allow the pointer to only jump from one representation to another. In effect, this would mean that there is always one representation highlighted. If there are more representations than can be displayed at one time on the display 201, scroll bars or a similar mechanism can be provided.

In one embodiment, selecting the representation 202 would start a demonstration for the corresponding content provider, after which the user is asked whether he wishes to subscribe to this content provider. If he does not want to subscribe, he is returned to the switchboard where he can make another choice. In this way, there is significant added value to users by making them aware of their choices in an enjoyable manner, in the comfort of their own homes.

The act of choosing a content provider at home, on line, should be positioned as relaxed and user friendly. The device 101 preferably is very audio-visual in the process of choosing a content provider, for instance by exploiting speech recognition technology to create as much of a 'guided' process as possible.

The user can select a content provider to subscribe to after having examined the demonstrations associated with the representations 202–207. To subscribe to a specific content provider, certain information such as the user's name and address, billing information and so on is usually required. It is advantageous to provide to this end a registration module 210 in the consumer device 101. Activating the registration module 210, for example by the press of a button on the remote control 103 or keyboard 104, or by choosing a menu option from a menu displayed on the display 201 results in a registration screen being displayed.

If the user needs to perform some initial setup upon first activating the device 101, the registration screen would preferably be part of this initial setup, with the option of deferring this activity to a later time.

In any case, when the registration screen has been called up, the user is asked to supply the necessary information via the keyboard 104. The registration may also involve entering personal preferences and other information. The consumer device 101 may be equipped with other modules, such as a digital wallet, that require user information. In such a case, the user information is preferably entered only once and shared between all the modules that require it.

After registering, the user can be presented with the overview as shown in FIG. 2 immediately. Alternatively, the registration screen could be deferred until the user has made a selection of a content provider for the first time. This allows him to 'play' with the content provider selection mechanism without having to fill in all kinds of forms. The registration information can be supplied to the gateway system 106 directly, or be supplied only when a selection has been made.

The user may also be asked to fill in a form with this information at a store where he has just bought the set-top box 102 or the access module 105. The store then sends the information to the operator of the gateway system 106.

Once the user makes a selection, in FIG. 2 shown by highlighting the representation 203, this selection 203 is received by a selection module 211, which subsequently submits it to the gateway system 106. The selection module 211 may further submit the registration information recorded by the registration module 210 to the gateway system 106. The gateway system 106 then informs the corresponding content provider, and may facilitate automated subscription of the user.

In an embodiment, after the registration has been submitted and the subscription to the chosen content provider has been realized, content provider specific software is downloaded to and installed on the device 101. The device 101 will then be ready for enhanced use. Consumers can then easily access the enhanced content through their remote control 103 and/or their keyboard 104 while watching TV.

As the user can, at a later time, choose another content provider, any content provider-specific software currently present in the device 101 is disabled or deleted, so that content provider specific software for the newly chosen content provider can be downloaded and installed.

This embodiment provides consumers with an upgradeable environment. Future service provider offers and applications can be downloaded online, within the limits of existing module memory, e.g., future browser versions. This means that the consumer can do more than choose the content provider he wants today; the consumer can choose the content provider he wants over time. Given the fact that the number and type of content providers will also increase over time, this offer ensures long-term consumer satisfaction, within the limits of its module technology. Such limits are mainly related to the modules' memory.

The representations or icons 202–207 can be stored in the consumer device 101, but preferably they are downloaded from the gateway system 106 when the device 101 is first activated and connected to the gateway system 106. This ensures that the user always gets the latest offerings, and obviates the need for large storage space in the device 101. When the device 101 is activated the first time, or when the user selects this option from a menu of some kind, the device 101 downloads the representations 202–207 from the gateway system 106 and presents them on the display 201.

The demonstrations associated with a representation 202–207 could be embedded in the representation, for example as short movie clips showing the various offerings of the content provider associated with that representation. Depending on processing capabilities in the consumer device 101, an interactive program which simulates some or all of the functionality of the content provider's system could be downloaded and executed as a demonstration. The demonstration could also constitute a trial run or guided tour, allowing the user to access some or all of the content offered by the content provider for some trial period so he can get a feel of what the actual system works like. In that case, the gateway system 106 should provide access to the consumer device 101 for the selected content provider for the duration of the trial period.

The six representations 202–207 need not be from six different content providers. One content provider may have multiple offerings. For example, the provider may offer a basic package containing only the most popular TV channels and Internet access, and a premium package containing a movie channel, a live sports channel, and a customized news feed. These offerings would then be shown as two different representations.

However, the representations 202–207 do not merely represent different TV channels offered by a single TV content provider, or different Websites or services linked to by a simple portal site. In the context of Internet services, the representations 202–207 would rather represent multiple portal sites themselves, such as the Microsoft Network, America Online, CompuServe, Prodigy and so on. The user could then pick one of these providers and switch to another one when desired.

This approach to Internet TV delivery offers several economic advantages over stand-alone hardware approaches:

It catches the consumer at a time when he is willing to spend money on a TV set (he has already decided to buy a new one) and is thinking about future TV functionality. A good comparison would be a consumer's decision whether to purchase air conditioning at the moment that he is buying a new car. The decision to buy the car has already been made; the consumer is already going to make a significant investment; the only question is how 'feature rich' that investment is going to be.

It offers the consumer improved ease of use, installation, and living room space management.

It provides the consumer with an ongoing choice of Internet TV service providers if he is dissatisfied with his initial choice.

The enhanced features provided by the device 101 should be easy for the consumer to use. The registration process, content provider selection process and the access to the selected content provider should be consumer friendly. The home installation process should be more user-friendly than installation of dedicated hardware.

FIG. 3 shows a second embodiment of the arrangement comprising consumer device 101, gateway system 106, and content providers 107, 108, 109. The gateway system 106 comprises a customer database 310, which contains subscription information on its customers. This information is preferably received from the registration module 210 in the consumer device 101. The user may also be asked to fill in a form with this information at a store where he buys the set-top box 102 or the access module 105. The store then sends the information to the operator of the gateway system 106, who enters it into the customer database 310.

The gateway system 106 further comprises a storage 320, in which the representations 202–207 can be stored for transmission to the consumer device 101. The gateway system 106 could periodically or on request contact the content providers 107–109 to download new versions of the representations. This way, the gateway system 106 can always offer the latest versions of the representations, and content providers 107–109 can easily update their offerings.

The selection 203 made by the user is transmitted to the gateway system 106 by the selection module 211 and received by a selection reception module 340 in the gateway system 106. The selection reception module 340 also receives the registration information if supplied. The registration information may be supplied together with the selection 203, but may also be supplied in advance, for example directly after the user has entered it using the registration module 210 in the consumer device 101. The registration information is then stored in the customer database 310.

The gateway system 106 now arranges for the user to be given access to the selected content provider's offerings, and for the content provider to be able to transmit its offerings to the consumer device 101. This will usually require a subscription for the user to the selected content provider. The gateway system 106 then supplies the registration information for the user, as registered in the customer database 310, to the selected content provider, and facilitates automated subscription of the user.

If the user was previously subscribed to another content provider, the gateway system 106 then also supplies an instruction to the other content provider to cancel the user's subscription.

The payment for the subscription may be arranged directly between the user and the content provider, although this means the user would have to cancel his subscription himself should he want to switch to another content provider. So, it is desirable that payment is also handled automatically by the gateway system 106. The user could, as part of the registration process, grant the gateway system operator authorization to debit his account for any subscription fees necessary to access a content provider's offerings. The gateway system 106 then authorizes the selected content provider to debit the user's account. When the user later switches to a new content provider, the gateway server 106 revokes the debit authorization of the old content provider and authorizes the new content provider.

Alternatively, if the user needs to subscribe to the gateway service, the payment could be deducted from the user's subscription fee and supplied to the selected content provider in a transparent fashion.

Other content providers might, instead of requiring a subscription fee, instead rely on business models such as advertising for generating revenue. In those cases of course no payments are necessary.

In the embodiment show in FIG. 3, the consumer device 101 and the content providers 107, 108, 109 are not directly connected. If the selected content provider wants to transmit content to the consumer device 101, he must do so via the gateway system 106. To this end, the content providers 107, 108, 109 are connected to respective receiving modules 337, 338, 339 in the gateway system 106. A transmission received by the one of the receiving modules 337, 338, 339 is passed on to transmitting module 331, depending on which provider is the selected content provider. The transmitting module 331 then retransmits the transmission to the consumer device 101.

The various content providers 107, 108, 109 may transmit the content in mutually different formats. If the gateway system 106 simply passes on the transmissions to the consumer device 101, then the set-top box 102 or access module 105 needs to be arranged for decoding content in all these formats, which would make it very complex and costly to build. So, in such a case it is desirable that the gateway system 106 converts the content as received from the selected content provider into a format which the set-top box 102 or access module 105 can decode and process. This conversion or transcoding process can best be implemented in the transmitting module 331.

The transcoding process may further require the adaptation of the transmitted content to the capabilities of the consumer device 101. For example, a conventional television has a screen resolution which is lower than the resolution of most monitors used with personal computers. Any pictures, movies or other content designed for computer-based browsers then needs to be transcoded to the low television screen resolution. The size of textual information also needs to be increased so it can be read from a greater distance.

An advantage of this embodiment is that the content providers 107, 108, 109 now have to distribute their content and offerings only to the gateway system 106, and not to all individual consumer devices 101. This saves them from having to deploy a large and expensive transmission infrastructure, such as a cable network or a number of satellites. A single connection to the gateway system 106 allows the content providers 107, 108, 109 to (potentially) reach the entire population of the gateway system's user base.

An additional advantage of this embodiment is that the user is now effectively locked into the service of the gateway system 106, giving the gateway system's operator a powerful position to negotiate with individual content providers 107, 108, 109. This makes the present arrangement an even more attractive business model.

The access module 105 or set-top box 102 in another embodiment is provided with a conditional access subsystem, which prevents access to any transmitted content that does not have an appropriate authorization code. The gateway system 106 then provides the selected content provider with the authorization code, so that the selected content provider can transmit the content together with the authorization code. When the user switches to another content provider, the authorization code is changed by the gateway system 106 so that only the other content provider can still supply content to the consumer device 101.

In traditional broadcasting, few broadcasters could claim that they 'owned' a consumer household; each broadcaster offered only one channel and it was easy for consumers to switch between channels on a minute-by-minute basis. Internet content providers are on their way to becoming broadcasters, more clearly so with the advent of streaming digital video, but their competitive dynamics differ from traditional broadcasters. Internet based broadcasters will each offer an incredibly wide array of entertainment and communications content—nearly unlimited if structured properly—and will create 'walled garden' environments and navigational formats that a living room consumer will be reluctant to leave. Therefore, Internet broadcasting takes on the dynamic of 'Winner Take All'. The digital content provider who signs up a customer gets nearly all of the subscription, advertising, and e-commerce profits from that subscriber's lifecycle on the service. Other providers get next to nothing.

Furthermore, several elements of a digital content provider's economics are scale-related. Providers with the largest subscriber bases can:

- create 'community' applications that enable its subscribers to talk exclusively to other subscribers
- afford good targeting advertising and command high ad rates
- amortize the cost of brand building The combination of these factors—winner take all at the subscriber level and important benefits from scale—lead digital content providers to compete through 'land grab' strategies. They will be willing to spend a significant amount of the expected Net Present Value (NPV) of a new customer on converting that customer to their customer base. The stock market has, to date, highly rewarded those content providers who have intelligently and aggressively grown their subscriber base through a 'land grab' approach.

In the near future, most major markets will have several Internet TV content providers competing to build customer bases in a 'land grab' manner. It is within this context that a gatewayed TV strategy makes economic sense. Each content provider 107–109 should be willing to pay the provider of the gateway system 106 a certain amount of the lifetime NPV of a consumer that is added to its customer base. The more valuable each consumer becomes, the higher the 'referral fee' that each content provider should be willing to pay.

What is claim is:

1. A method for providing access to a consumer device (101), comprising the acts of:

electronically presenting to a consumer representations of services from a plurality of content providers (107, 108, 109), each service being respectively offered by one content provider from among said plurality of content providers (107, 108, 109), receiving a selection (203) from the consumer for a demonstration of the features of the service offered by a specific one of content providers from among the plurality of content providers (107, 108, 109): and responsive to receiving said selection (203), initiating a demonstration of said service features for the specific one of content providers;

querying the consumer at the termination of said demonstration to determine if the consumer wishes to subscribe to the services of the specific one of content providers; and providing the specific one of content providers access to the consumer device (101), responsive to determination that the consumer wishes to subscribe to the service of the specific one of said content providers.

2. The method of claim 1, further comprising providing registration information on the user to the selected content provider for facilitating a subscription for the user to the selected content provider.

3. The method of claim 1, wherein providing access comprises receiving a transmission from the selected content provider and intended for the consumer device (101), and retransmitting the transmission to the consumer device (101).

4. The method of claim 3, wherein providing access further comprises transcoding the transmission to a format suitable for the consumer device (101).

5. The method of claim 1, further comprising receiving a referral fee from the selected content provider after arranging the access to the consumer device (101).

6. An arrangement between a gateway system and a consumer device for providing a user-selected content provider access to the consumer device (101), wherein the consumer device (101) comprises;

presentation means (201) which electronically present to a user representations of services (202–207) from a plurality of content providers (107, 108, 109), each service being respectively offered by one content provider from among said plurality of content provider (107, 108, 109);

selection means (103, 104) for receiving a selection from the user for a demonstration of the features of a service offered by a specific one of content providers (107, 108, 109) from among the plurality of content providers (107, 108, 109) to the gateway system (106) in communication with the consumer device (101); determination means which determine, at the termination of said demonstration, if the user wishes to subscribe to the demonstrated service offered by said specific one of content providers (107, 108, 109); and selection means (211) for submitting a selection (203) indicating the user-selected content provider from among the plurality of content providers (107, 108, 109) to the gateway system (106) in communication with the consumer device (101); and the gateway system (106) comprises;

selection reception means (340) for receiving the selection (203) indicating the user-selected content provider from the selection means (211); and access means (331, 337, 338, 339) for providing the user-selected content provider access to the consumer device (101).

7. The arrangement of claim 6, wherein the access means (331, 337, 338, 339) are arranged for receiving a transmission from the user-selected content provider and intended for the consumer device (101) and retransmitting the transmission to the consumer device (101).

8. The arrangement of claim 7, wherein the access means (331, 337, 338, 339) are further arranged for transcoding the transmission to a format suitable for the consumer device (101).

9. The arrangement of claim 6, further comprising registration means (310) for providing registration information on the user to the user-selected content provider.

* * * * *